United States Patent [19]

Pilarczyk

[11] Patent Number: 4,555,902
[45] Date of Patent: Dec. 3, 1985

[54] HEAT RECOVERY SYSTEM
[75] Inventor: Karol Pilarczyk, Loudonville, N.Y.
[73] Assignee: Vevy Manufacturing Inc., Latham, N.Y.
[21] Appl. No.: 570,882
[22] Filed: Jan. 16, 1984
[51] Int. Cl.[4] .......................... F02C 7/08; F02G 1/00
[52] U.S. Cl. ..................................... 60/39.5; 60/39.83
[58] Field of Search ................ 60/39.182, 39.5, 39.83, 60/39.181, 39.183; 122/73

[56] References Cited
U.S. PATENT DOCUMENTS

| | | | |
|---|---|---|---|
| 3,118,429 | 1/1964 | Hochmuth | 60/39.182 |
| 3,642,061 | 2/1972 | Waeselynck | 60/39.183 |
| 3,905,191 | 9/1975 | Matto | 60/39.07 |
| 4,182,117 | 1/1979 | Exley et al. | 60/39.07 |
| 4,182,119 | 1/1980 | Hurley | 60/39.07 |

FOREIGN PATENT DOCUMENTS 1199042 12/1959 France ............................... 60/39.07

Primary Examiner—Louis J. Casaregola
Assistant Examiner—Timothy S. Thorpe
Attorney, Agent, or Firm—Roland T. Bryan

[57] ABSTRACT

A heat recovery system for supplementing the exhaust mass flow from a gas turbine with additional flow of preheated air to provide greater steam output from a heat recovery unit such as a steam generator. The supplemental preheated air is ambient ventilation air which is used to cool the outer enclosure of the gas turbine. A diverter valve is employed to selectively add to the mass flow from the gas turbine any appropriate mass flow of the ventilation air between zero and a maximum amount. An eductor may be used to aid a blower for moving the supplemental air. A duct burner upstream from the heat recovery unit is employed to raise the temperature of a mixture of turbine exhaust gases and ventilation air being supplied to the heat recovery unit. In a similar fashion, supplemental preheated air may be taken from air used for cooling a generator or other primary load being driven by the gas turbine.

8 Claims, 3 Drawing Figures

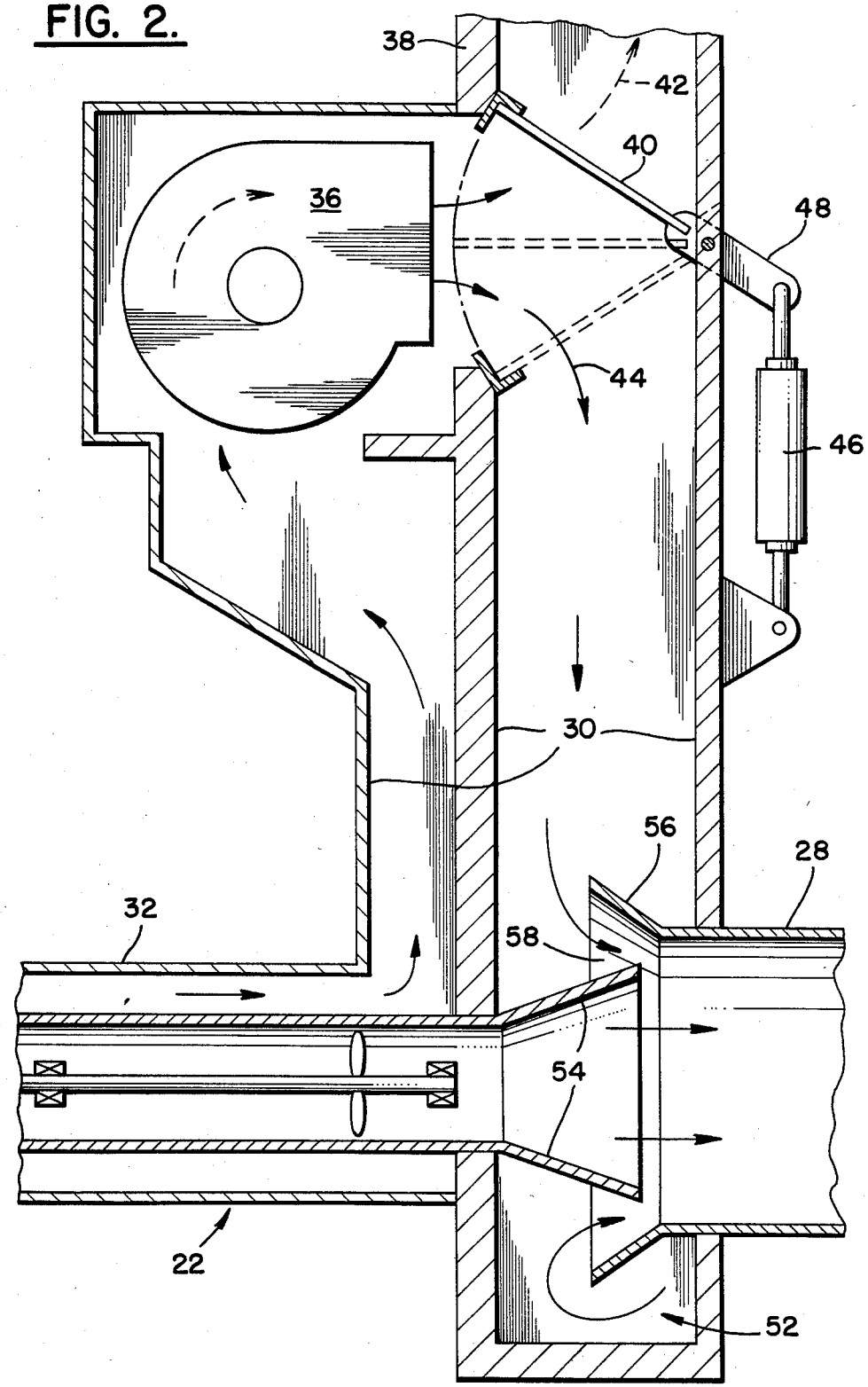

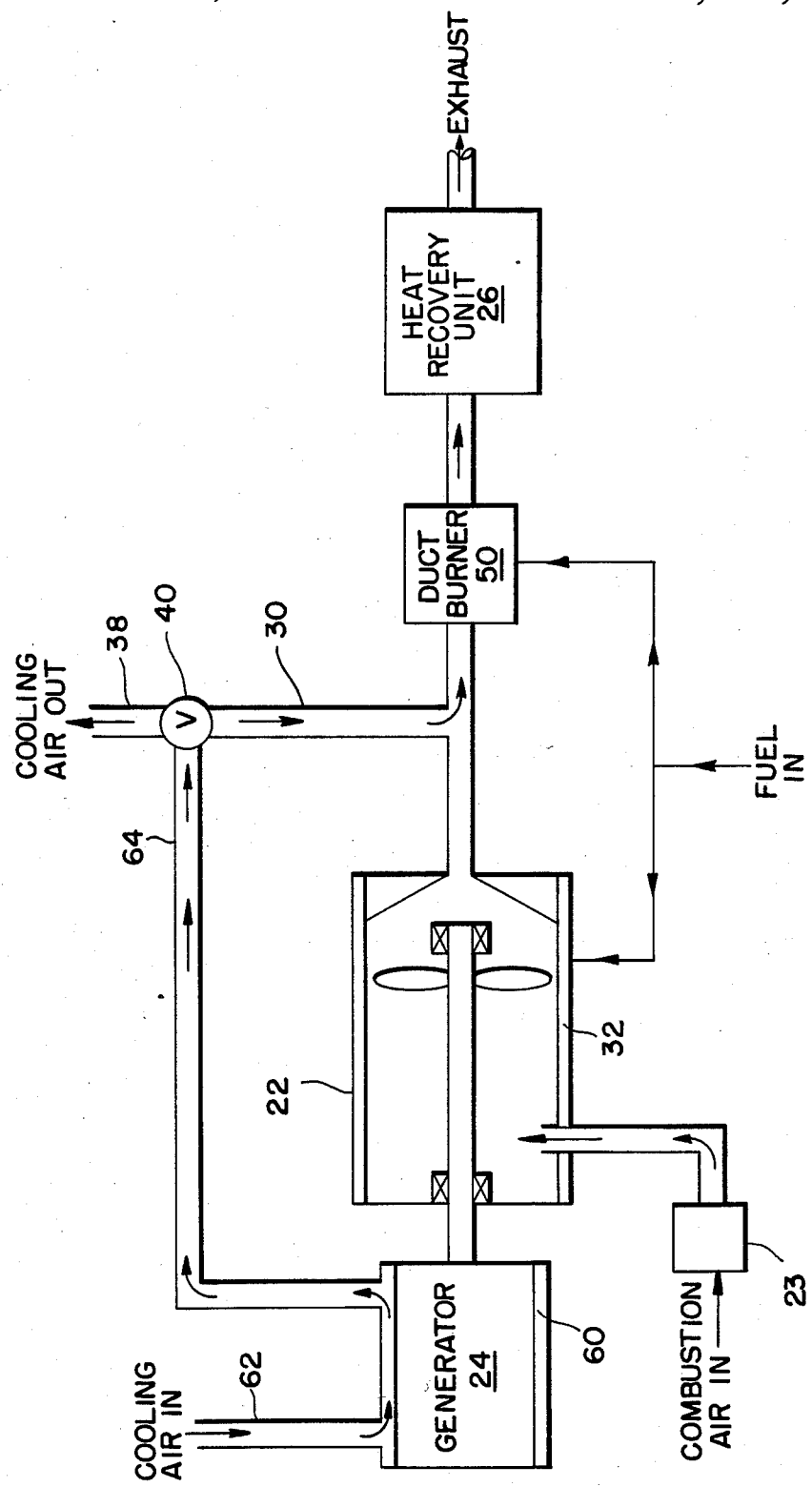

HEAT RECOVERY SYSTEM

BACKGROUND OF THE INVENTION

1. The Field of the Invention

The present invention relates generally to techniques for recovery of waste heat in a power generation system, and, specifically, to heat recovery techniques for the secondary air flow system of a gas turbine engine when it is utilized as a prime mover.

2. Description of the Prior Art

Gas turbines have been used for many years in industrial applications. They have seen service as emergency power units, auxiliary power units, and more recently as a primary source of power for an industrial facility. With continuous refinement over the years, gas turbines have reached a level of efficiency at which they can provide power to a user at a less expensive rate in many instances than can be provided by the local public utility. In typical installations of this nature the gas turbine engine drives a generator or other suitable load. As the cost of fuel has increased, there has been ever greater emphasis on capturing the exhaust gases of the gas turbine and putting them to work by way of a heat recovery unit such as a steam generator. Still a further refinement has resulted in the addition to the system of a duct burner downstream of the gas turbine engine. Since the exhaust gases from the gas turbine are comprised of only approximately 20% by weight, of products of combustion, fuel added to those exhaust gases in the duct burner and then ignited, serves to more thoroughly complete the combustion process with the oxygen available to the system.

Even with such improvements as these, there has been a continuing quest for still further refinements. One typical example of a contemporary effort to achieve still greater efficiencies in heat recovery from a prime mover is found in *Diesel & Gas Turbine Worldwide*, Vol. XV, No. 8, October 1983, p. 48, "BOOST-FIRED CHP SYSTEM" by John Moon. According to that disclosure, the exhaust gases from a diesel engine used primarily to drive an alternator are afterburned to fire a heat exchanger and the feedwater for the heat exchanger is additionally heated in a supplementary fashion by the heated engine cooling water. While the publication appears to disclose a highly desirable concept when using diesel engines as a prime mover, it does not have any practical application to the operation of a gas turbine as a prime mover.

It was with recognition of the need which exists for still greater efficiencies and of the state of the art as generally described above, that the present invention was conceived and has now been reduced to practice.

SUMMARY OF THE INVENTION

It is customary in gas turbine installations of the nature described above to provide the gas turbine with a weatherproof and soundproof enclosure. However, it is necessary to remove on a continuous basis the heat radiated from the engine and this is normally achieved by providing continuous ventilation of the enclosure using an appropriate ventilation fan and ducting. With this as a background, the present invention provides a heat recovery system for supplementing the exhaust mass flow from the gas turbine with additional flow of preheated air to provide greater output from a heat recovery unit such as a steam generator which is a component of a conventional system. This is achieved by utilizing the supplemental preheated air which is the ambient air used to cool the outer enclosure of the gas turbine. A diverter valve is employed to selectively add to the mass flow from the gas turbine any appropriate mass flow of the supplemental air between zero and a maximum amount. An eductor may be used to aid a blower for moving the supplemental air. A duct burner upstream from the heat recovery unit is employed to raise the temperature of the mixture of turbine exhaust gases and supplemental preheated air being supplied to the heat recovery unit. In a similar fashion, supplemental preheated air may be taken from air used for cooling a generator or other primary load being driven by the gas turbine. A typical installation may utilize a General Electric LM-500 gas turbine which develops approximately 5,450 horsepower. Typically, the flow exhausting from the LM-500 gas turbine is approximately 24,000 cubic feet per minute. Similarly, the flow of ventilation air which is typically used to cool the outer enclosure of the gas turbine engine lies within the range of 8,000-10,000 cubic feet per minute. By introducing the ventilating air into the system downstream of the turbine exhaust, it will be appreciated that the mass flow of the system will be increased by something greater than one third. Thus, the air available to the system is utilized to the greatest extent possible. Additionally, 100% of the oxygen in the ventilating air is available for combustion in the duct burner.

Of course, it will be appreciated that the ventilating air not only increases the mass flow of air to the system as could be achieved by drawing additional ambient air into the system; it also adds to the heat of the system since it is already heated approximately 20° F. over ambient after having passed through and around the outer enclosure for the gas turbine.

A particularly significant feature of the invention resides in the flexibility it provides to a system. Specifically, the output requirements from the system vary as a function of time of day, seasons, and workload imposed on the system. Thus, there are periods of time when the user would only seek a minimal amount of steam production; other times when moderate amounts would be sought; and still other times when a maximum production of steam would be necessary. The present invention can accommodate such varying demands. Specifically, it is possible to operate a system incorporating the invention both without the addition of the ventilating air and without the duct burner. In this mode of operation, only a minimal amount of steam would be produced. For the production of moderate amounts of steam, the duct burner would be operated and the mass flow of ventilation air could be adjusted over a wide range dependent upon the specific amount of steam desired. For a maximum steam production, the duct burner would be operated and the maximum amount of ventilating air would be provided to the system.

Other and further features, objects, advantages, and benefits of the invention will become apparent from the following description taken in conjunction with the following drawings. It is to be understood that both the foregoing general description and the following detailed description are exemplary and explanatory and are not restrictive of the invention. The accompanying drawings which are incorporated in and constitute a part of this invention illustrate typical embodiments of the invention and, together with the description, serve to explain the principles of the invention.

DETAILED DESCRIPTION OF THE DRAWINGS

In the drawings:

FIG. 2 is a side elevation view, partially in section, illustrating in greater detail elements of the invention illustrated in FIG. 1; and FIG. 3 is a schematic diagram of a system, similar to FIG. 1, but illustrating another embodiment of the invention.

DESCRIPTION OF THE PREFERRED EMBODIMENTS

Figure 1:
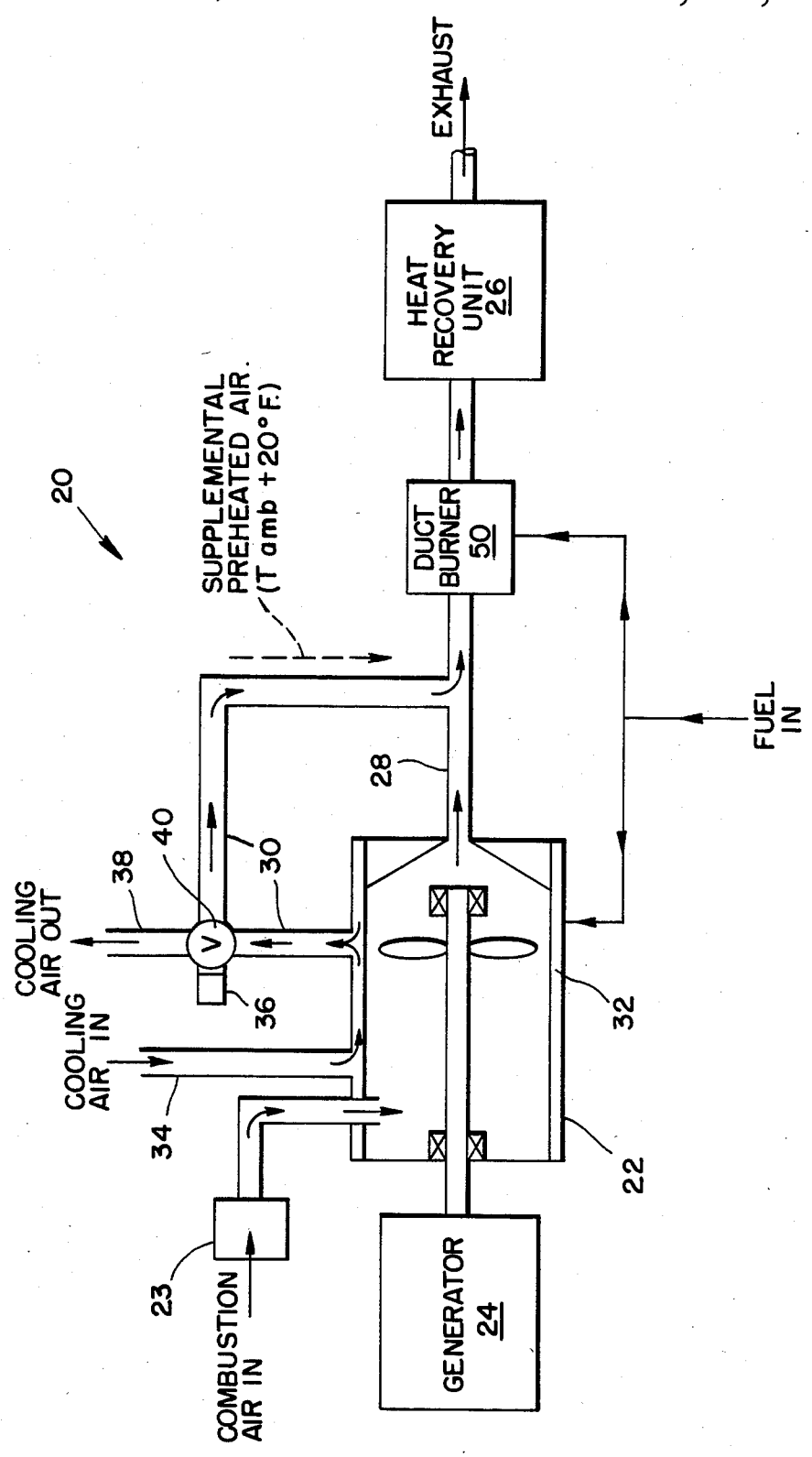
FIG. 1 is a schematic view of a gas turbine engine used in an industrial application and incorporating the heat recovery system of the present invention.

Refer now to the drawings, and initially to FIG. 1 which generally illustrates, schematically, a power generation system 20 which embodies the principles of the present invention. In accordance with the invention, the power generation system 20 utilizes a gas turbine engine including an outer enclosure and a power turbine, said system providing a primary mode of operation whereby the power turbine is operationally connected to a generator for driving said generator to produce electricity, and also providing a secondary mode of operation whereby a heat recovery unit is located downstream of said gas turbine engine and including first duct means for confining flow of exhaust gases from said gas turbine engine to said heat recovery unit for producing steam, the improvement comprising: second duct means for confining flow of ambient ventilation air used to cool said outer enclosure after the ventilation air passes through and around said outer enclosure, the ventilation air thereby becoming heated; said second duct means communicating with said first duct means downstream of said gas turbine engine; flow inducing means for drawing the ventilation air through said second duct means and into said first duct means; said second duct means including an outlet to direct the ventilation air out of said system; and a diverter valve selectively movable between first and second positions such that, in said first position, the ventilation air is drawn through the outlet and exhausted from said system, and in said second position, the ventilation air is drawn into said first duct means downstream from said gas turbine engine and mixed with the exhaust gases from said gas turbine engine; and a duct burner in communication with said first duct means intermediate said gas turbine and said heat recovery unit, said duct burner being selectively operable to raise the temperature of the mixture of the ventilation air and exhaust gases prior to its reception within said heat recovery unit.

As embodied herein, with continuing reference to FIG. 1, the power generation system 20 utilizes a gas turbine engine 22 as a prime mover. As indicated in the drawings, the gas turbine 22 draws in ambient air for combustion through a suitable inlet 23 and is operatively connected to a generator 24 which is suitably sized to be compatible with the gas turbine for generating electricity. This is the primary mode of operation for the gas turbine 22. However, according to a very important secondary mode of operation of the gas turbine, a suitable heat recovery unit 26, such as a steam generator, is located downstream of the gas turbine engine and a first duct 28 is provided for confining flow of exhaust gases from the gas turbine engine to the heat recovery unit for producing steam. Additionally, the system 20 includes a second duct 30 which is used to cool an outer enclosure 32 of the gas turbine engine 22. It is customary to provide gas turbines which are utilized in industrial applications with weatherproof and soundproof enclosures, such as the enclosure 32. Such enclosures enable removal on a continuous basis of the heat radiated from the turbine casing and this is normally achieved by providing continuous ventilation of the enclosure using an appropriate ventilation fan and ducting.

In the instance illustrated, an inlet duct 34 serves to draw ambient air into the outer enclosure 32 on a continuous basis as the gas turbine engine is operated. This ventilation air becomes heated as it passes through and around the outer enclosure. The second duct 30 communicates with the first duct 28 downstream of the gas turbine engine 32 and flow inducing means, including a ventilation fan 36, serves to draw the ventilation air through the second duct 30 and into the first duct 28.

The second duct 30 is seen to include an outlet 38 which serves to direct the ventilation air out of the system if that should be desired. The duct 30 also includes a diverter valve 40 which, as particularly well seen in FIG. 2, is selectively movable between first and second positions. The first position is illustrated in phantom and, in that position, the air flowing through the enclosure 32 is drawn through the outlet 38 as indicated by an arrow 42 and exhausted from the system. With the diverter valve 40 in the second position as indicated by solid lines, ventilation air follows a path as indicated by an arrow 44. It is drawn into the first duct 28 downstream from the gas turbine where it is mixed with the exhaust gases from the gas turbine. As shown in FIG. 2, a hydraulic or pneumatic actuator 46 is suitably connected, as by a link 48 to the diverter valve 40 for moving the valve, as previously described, between its open and closed positions.

With reference again to FIG. 1, a duct burner 50 is in communication with the duct 28 in the flow path between the gas turbine engine 22 and the heat recovery unit 26. The duct burner is a commercially available item which may be oil or natural gas fired and serves to add substantial heat to the system by the ignition of additional fuel utilizing the unburned oxygen from the turbine exhaust as well as the fresh oxygen from the ventilation air. Duct burners of a design suitable for the system 20 are manufactured by Coen Company, Inc. of San Francisco, Calif., and by Killebrew Engineering Corp. of St. Louis, Mo. Thus, the combined mass flow of the ventilation air and turbine exhaust gases is raised substantially in temperature prior to reception of the mixture within the heat recovery unit 26. Typically, the temperature of the turbine exhaust is 960° F., the temperature of the ventilation air when it reaches the duct 28 is approximately 20° F. over ambient, and the temperature of the mixture of turbine exhaust and ventilation air immediately downstream from the duct burner 50 is 1545° F. The gases exiting from the heat recovery unit 26 have a temperature of approximately 300° F.

In accordance with the invention, the power generating system is generally as previously described wherein a diverter valve is selectively movable to any one of a wide range of positions between said first and second positions so as to thereby control the mass flow of ventilation air drawn from said outer enclosure through said second duct means and into said first duct means. As embodied herein, with particular reference to FIG. 2, the actuator 46 is so chosen as to be able to move the diverter valve 40 to any one of a wide range of positions between the first position and the second position as previously described. The dotted line position of the valve 40 (see FIG. 2) indicates an intermediate position where some of the flow of ventilation air travels out through the outlet 38 and some continues through the duct 30 and into the duct 28. Thus, the mass flow of ventilation air into the duct 28 can be adjusted from a maximum flow to zero flow and anywhere inbetween thereby providing an operator with a wide range of opportunity as far as steam output from the heat recovery unit 26 is concerned.

In accordance with the invention, the power generating system is generally as previously described wherein said flow inducing means includes a blower upstream of said diverter valve and an eductor downstream therefrom within said second duct means at the interface between said gas turbine engine and said first duct means, said eductor including a diverging exhaust nozzle of said gas turbine engine and a generally converging inlet nozzle of said first duct means, said exhaust nozzle being of smaller diameter than said inlet nozzle, generally concentric therewith, and received therewithin whereby said inlet nozzle and said exhaust nozzle define an annular region therebetween for passage therethrough of the ventilating air as it flows from said second duct means into said first duct means.

As embodied herein, with continuing reference to FIG. 2, the flow inducing means includes a blower fan or ventilation fan 36, as previously described, upstream of the diverter valve 40. The flow inducing means also includes an eductor 56 downstream of the diverter valve 40 and located within the duct means 30 at the interface between the gas turbine engine 22 and the first duct 28. Indeed, the eductor 56 is a construction which includes a generally diverging exhaust nozzle 54 of the gas turbine engine and a generally converging inlet nozzle 56 of the duct means 28 which is, in effect, a venturi nozzle. As seen in FIG. 2 the exhaust nozzle 54 is of generally smaller diameter than the inlet nozzle 56 and extends into the nozzle 56. Also, the nozzle 54 is generally concentric with the nozzle 56 and together they define an annular region 58 through which the ventilating air from the outer enclosure 32 flows as it proceeds from the duct 30 into the duct 28. The flow of the exhaust gases from the gas turbine engine 22 through the exhaust nozzle 54 develops a suction in the annular region 58 thereby aiding the ventilation fan 36 and causing flow of the ventilation air into the duct means 28. An added advantage of the use of the eductor 52 is in the rapid mixing of the exhaust gases from the gas turbine with the ventilation air from the outer enclosure 32.

A slightly altered embodiment of the invention is illustrated in FIG. 3. In this embodiment, the component being cooled is the outer enclosure for the generator 24 which is being driven a gas turbine engine to develop electricity. As with the enclosure 32 of the gas turbine engine, an enclosure 60 for the generator also develops large amounts of heat in the course of its operation and requires cooling. Customarily, ambient cooling air is drawn into, around, and through the outer enclosure 60, then returned to the atmosphere. According to the invention, however, cooling air drawn into an inlet 62, through the enclosure 60, then through an outlet duct 64 which communicates with the diverter valve 40, as previously described. This arrangement can be used in combination with the arrangement illustrated in FIG. 1 and described with respect thereto, if desired. The modification of FIG. 3, therefore, will add still more to the mass flow of heated air which can be added to the exhaust gases from the gas turbine within the duct 28. Of course, as with the embodiment illustrated in FIG. 1, the mass flow of cooling air from the generator 24 can be completely returned to the atmosphere through the outlet 38, or completely directed into the duct means 28, or some predetermined percentage of flow can be permitted through the outlet 38 and into the duct 28, all according to the position of the diverter valve 40 as controlled by the actuator 46.

The invention, then, in its broader aspects, is not limited to the specific details shown and described; departures may be made from such details without departing from the principles of the invention and without sacrificing its chief advantages.

I claim:

1. In a power generating system utilizing a gas turbine engine including an outer enclosure and a power turbine, a primary mode of operation with the power turbine operationally connected to a generator for driving said generator to produce electricity, and a secondary mode of operation with a heat recovery unit located downstream of said gas turbine engine and including first duct means for confining flow of exhaust gases from said gas turbine engine to said heat recovery unit, the improvement comprising:

second duct means for confining flow of ambient ventilation air used to cool said outer enclosure after the ventilation air passes through and around said outer enclosure, the ventilation air thereby becoming heated; said second duct means communicating with said first duct means downstream of said gas turbine engine;

flow inducing means for drawing the ventilation air through said second duct means and into said first duct means;

said second duct means including an outlet to direct the ventilation air out of said system; and a diverter valve selectively movable between first and second positions such that, in said first position, the ventilation air is drawn through the outlet and exhausted from said system, and in said second position, the ventilation air is drawn into said first duct means downstream from said gas turbine engine; and a duct burner in communication with said first duct means intermediate said gas turbine engine and said heat recovery unit, said duct burner including means for the addition of fuel and the ignition of said additional fuel in the presence of unburned oxygen from the turbine exhaust as well as fresh oxygen from the ventilation air.

2. The improvement to a power generating system as set forth in claim 1 wherein said diverter valve is selectively movable to any one of a wide range of positions between said first and second positions so as to thereby control the mass flow of ventilation air drawn from said outer enclosure through said second duct means and into said first duct means.

3. The improvement to a power generating system as set forth in claim 1 wherein said flow inducing means includes a blower upstream of said diverter valve and an eductor downstream therefrom within said second duct means at the interface between said gas turbine engine and said first duct means.

4. The improvement to a power generating system as set forth in claim 3 wherein said eductor includes a generally diverging exhaust nozzle of said gas turbine engine and a generally converging inlet nozzle of said first duct means, said exhaust nozzle being of smaller diameter than said inlet nozzle, generally concentric therewith, and received therewithin whereby said inlet nozzle and said exhaust nozzle define an annular region therebetween for passage therethrough of the ventilating air as it flows from said second duct means into said first duct means.

5. A power generating system comprising:
a gas turbine engine having an outer enclosure;
a heat recovery unit operable for producing steam;
first duct means for confining flow of exhaust gases from said gas turbine engine to said heat recovery unit to operate said heat recovery unit for producing steam;
second duct means for confining flow of ambient air used to cool said outer enclosure after said air passes through and around said outer enclosure, the ventilation air thereby becoming heated, said second duct means communicating with said first duct means downstream of said gas turbine engine;
flow inducing means for drawing the ventilation air through said second duct means and into said first duct means;
said second duct means including an outlet to direct the heated air out of said system; and a diverter valve selectively movable between first and second positions such that, in said first position, the ventilation air is drawn through the outlet and exhausted from said system, and in said second position, the ventilation air is drawn into said first duct means downstream from said gas turbine engine, and mixed with the exhaust gases from said gas turbine engine; and,
a duct burner in communication with said first duct means intermediate said gas turbine engine and said heat recovery unit, said duct burner including means for the addition of fuel and the ignition of said additional fuel in the presence of unburned oxygen from the turbine exhaust as well as fresh oxygen from the ventilation air.

6. A power generating system as set forth in claim 5 wherein said diverter valve is selectively movable to any one of a wide range of positions between said first and second positions to thereby control the mass flow of heated air drawn from said outer enclosure, through said second duct means, and into said first duct means.

7. A power generating system as set forth in claim 5 wherein said flow inducing means includes a blower upstream of said diverter valve and an eductor downstream therefrom within said second duct means at the interface between said gas turbine engine and said first duct means.

8. A power generating system as set forth in claim 7 wherein said eductor includes a diverging exhaust nozzle of said gas turbine engine and a diverging inlet nozzle of said first duct means, said exhaust nozzle being of smaller diameter than said inlet nozzle, generally coaxial therewith, and received therewithin whereby said inlet nozzle and said exhaust nozzle define an annular region therebetween.

* * * * *